(12) United States Patent
Smith et al.

(10) Patent No.: US 7,188,122 B2
(45) Date of Patent: Mar. 6, 2007

(54) LIVE IMAGE SERVER AND CLIENT (75) Inventors: Greg Smith, Bellevue, WA (US); John Krumm, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 902 days.

(21) Appl. No.: 10/095,997

(22) Filed: Mar. 11, 2002

(65) Prior Publication Data

US 2003/0169285 A1   Sep. 11, 2003

(51) Int. Cl.
*G06F 17/30* (2006.01)
(52) U.S. Cl. .................. 707/104.1; 707/8; 707/200
(58) Field of Classification Search ................ 707/1, 707/104.1, 2, 8, 10, 200, 201, 206, 100; 345/88.13, 345/575, 739, 429.1, 239, 14.15, 14.07, 14.14, 345/22; 709/201; 725/37–41, 115–117
See application file for complete search history.

(56) References Cited

U.S. PATENT DOCUMENTS 6,154,771 A * 11/2000 Rangan et al. .............. 709/217
6,219,381 B1 * 4/2001 Sawada et al. ......... 375/240.14
6,891,566 B2 * 5/2005 Marchese ................ 348/211.3

* cited by examiner

*Primary Examiner*—Cheryl Lewis
(74) *Attorney, Agent, or Firm*—Lyon & Harr, LLP; Richard T. Lyon (57) ABSTRACT

A system and process for making live digital video feeds simultaneously available to multiple applications running on a computing device. This involves using a live image server that maintains a camera directory file containing the names of available feeds, and the name and location of an image file for each feed. The image file includes image data corresponding to a current frame of the feed and an index indicative of a frame sequence number. Each time a new frame becomes available, image data representing the frame is put into its associated image file, in place of previously stored image data. A client application chooses a feed from the camera directory file, then accesses the associated image file and makes a copy of the image data. When the client wants a new frame, it determines if the image file index has changed. If so, the client copies the new image data.

26 Claims, 9 Drawing Sheets

LIVE IMAGE SERVER AND CLIENT

BACKGROUND

1. Technical Field

The invention is related to sharing digital video signals, and more particularly to a system and process for making a live digital video feed from one or more imaging devices, such as a digital video camera, simultaneously available to multiple applications running on a computing device.

2. Background Art

Sharing a live video feed among more than one program or application running on a computing device, or among multiple applications running on a series of networked computing devices can be extremely advantageous. For instance, take the situation where a video signal is being provided to a PC via a desktop video camera. It would be advantageous to share a live video feed among more than one application. In this way the same video feed could be used to perform multiple tasks simultaneously. For example, the feed from a desktop camera facing a PC user could be used by one application to monitor whether or not the user was present, while the feed could be used by another application to track eye gaze to determine where or if the user is looking at the display screen. Or, the aforementioned live video feed could be used by one application to provide input to a video conference, while another program uses the feed to track the person's eyes to control the movement of a screen cursor. Another example of a situation where multiple applications could use the same live video feed simultaneously would be where a camera is situated to view a living space. The feed from that camera could be used by different applications to monitor the room for motion, track people's location, track objects, record video, update a webcam page, and measure light levels, among other things.

Further, it would be advantageous for an application to be able to choose among camera feeds coming from multiple cameras connected to a computing device. In this way, an application could select the view most suited to its purpose, or perhaps even select more than one feed at a time for processing.

Sharing an analog video signal among applications running on a computing device can be easily accomplished by employing a conventional analog video signal splitter to make copies of the analog video feed. The copied signal can then be routed to different frame grabbers respectively associated with applications running on the computing device. However, the situation is quite different when dealing with digital video signals.

A digital video signal, such as those output by digital video cameras, does not lend itself to copying so simply. In fact, at present there is no system or process known to the inventors that is capable of making a digital video feed simultaneously available to multiple applications, or making multiple digital video feeds available to one or more applications running on a computing device. However, it is these live digital video feeds that are typically employed by applications to perform the tasks described above.

SUMMARY

The present live image server and client scheme provides the needed simultaneous sharing of live digital video signals among applications. Namely, a system and process is provided for making a live digital video feed from one or more imaging devices, such as a digital video camera, simultaneously available to multiple applications running on a computing device. In other words, digital video signals are taken in from multiple imaging devices and the image data is made available to multiple client applications. This is essentially accomplished using memory-mapped files. There is one such file for each imaging device or camera (called the "image file"), plus a camera directory file (whose name is assumed known to both the server and clients) containing the names of all the cameras (or their feeds) and the names and memory locations of their associated image files. Each time a new frame is output by a camera, image data representing the frame is put into the image file associated with that camera, in lieu of any previously stored image data. Along with the image data, the image file also contains an image counter or index. This image index indicates the frame number starting with the frame associated with the first image data that was included in an image file. Each time image data associated with a new frame is placed in the image file, the image index is incremented. This allows the client applications to determine whether a new frame of the video feed is available as will be discussed next.

A client application reads the camera directory file and chooses which camera feed(s) it wants to use. The client then attempts to get a read lock on the image file associated with that feed. Multiple clients can lock the image file for reading simultaneously, so multiple clients can read the same image at the same time. If the file is locked by the server for writing (as occurs when the server updates the file with new image data) and remains locked for too long, then the client starts over at the beginning by looking at the camera directory file again. This could happen if the server were to crash with its write lock in place. The client application starts over in hopes that the image server has been shut down and restarted, which could happen manually or via an automated external process monitoring/management system. If the read lock is successfully obtained, the client makes a local copy of the image data, releases the lock, and then performs whatever local image processing is appropriate. When the client wants a new image, it checks the image index value in the image file. If this value has not changed since the last image was processed, the client waits and checks again, and over and over. If the total wait time exceeds a prescribed maximum, the client starts over at the beginning by looking at the camera directory file. In this case, the client starts over in hopes that a misbehaving client has locked the image file for too long, preventing the server from writing new image data into the file, and that the server has started another image file for the camera. This is a possibility because if the server finds that an image file is read locked too long when it has new image data to place in the file, then the server creates a new image file and updates the camera directory file with the new image file name. Accordingly, the image server will still continue making live video available to other client applications even if one particular client locks an image file for too long. If, however, the client application is able to establish a read lock on the image file, it copies the image data, releases the lock, and performs whatever local image processing is appropriate, as before. This process continues for as long as the client wishes to access the video feed or feeds, or until the video feed is terminated.

The net effect of the locks and timeouts is that clients can come and go arbitrarily. If a client locks an image file for too long, the server will abandon that file and the other clients will soon discover the new file name and continue getting live images. In addition, the server can go away and then restart while the clients continue running. The clients will start to pick up images as soon as the server restarts and places a reference to a new image file in the camera directory file.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
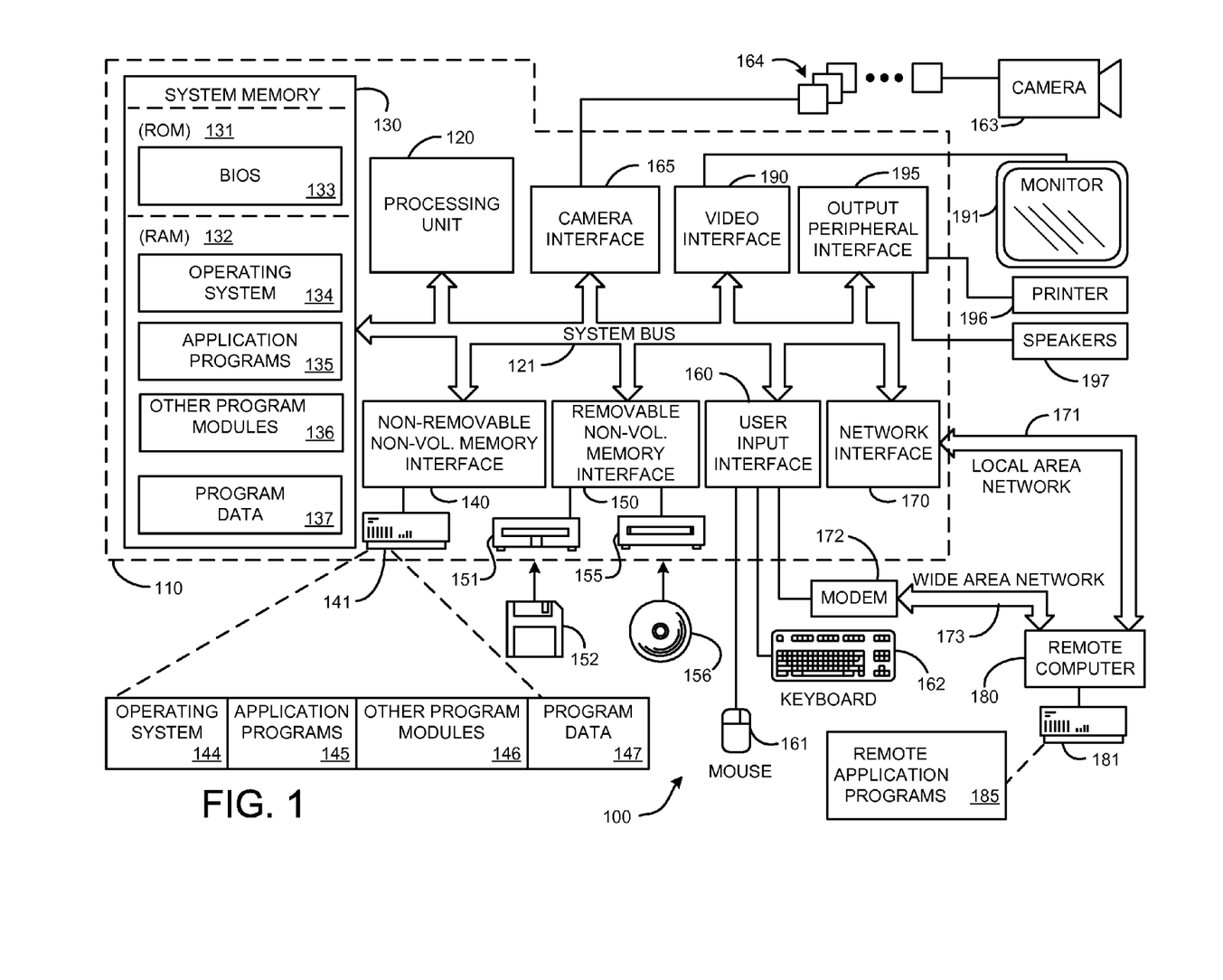
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2A:
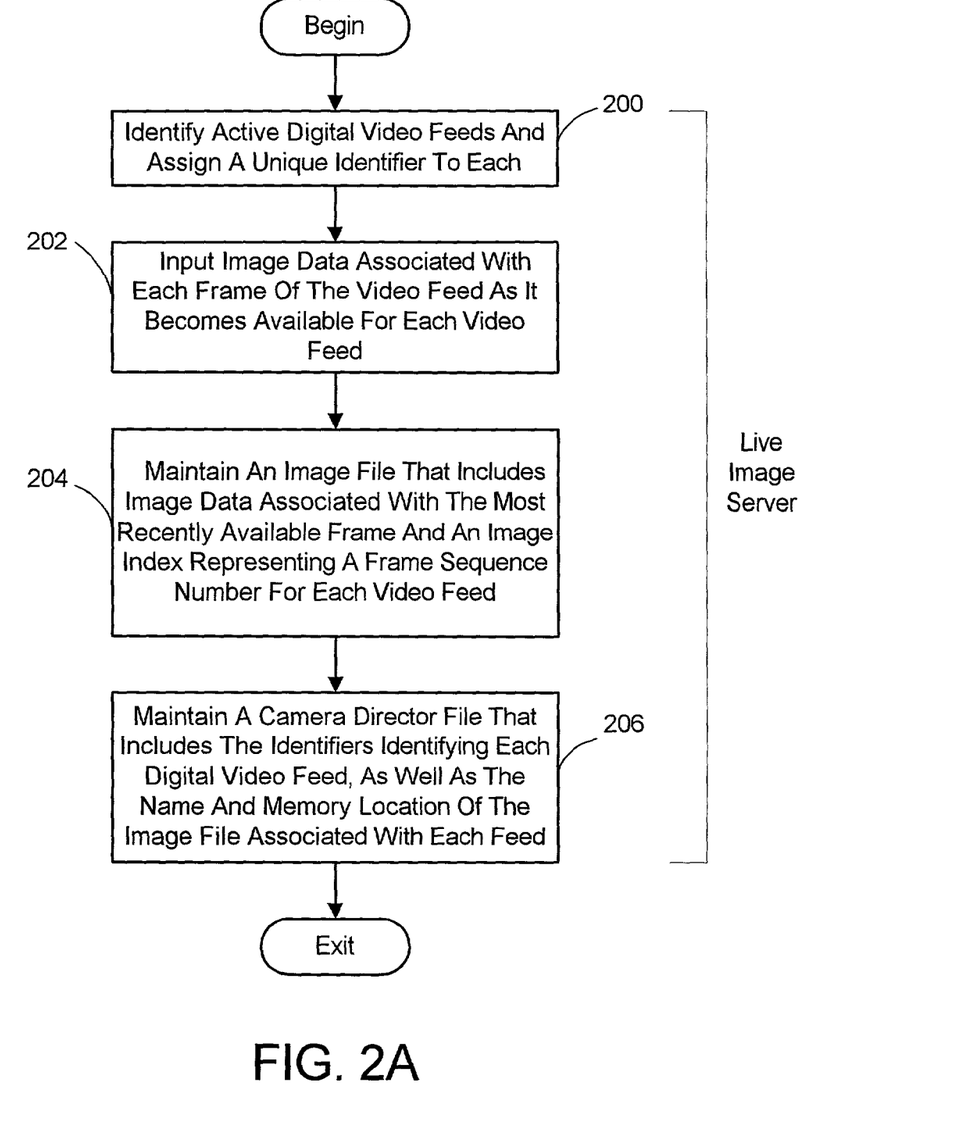
FIG. 2A is a flow chart diagramming an overall process for making multiple live digital video feeds simultaneously available to multiple applications running on a computer using a live image server.

The exemplary operating environment having now been discussed, the remaining part of this description section will be devoted to a description of the program modules embodying the invention. The system and process according to the present invention involves making live digital video feeds from one or more imaging devices, such as a digital video camera, simultaneously available to multiple applications running on a computing device. In general, a live image server makes the video available to client applications by, as shown in the high-level flow diagram of FIG. 2A:

a) determining what digital video feeds are active and assigning a unique identifier to each feed that is to be made available to the applications (process action 200);
  b) for each video feed assigned an identifier, inputting image data associated with each frame of the video feed as it becomes available (process action 202), and maintaining an image file which is accessible by each of the client applications and which includes image data associated with the most recently available frame of the video feed and an image index representing a frame sequence number (process action 204); and
  c) maintaining a camera directory file which is accessible by each of the client applications and which includes identifiers identifying each digital video feed currently available for access, as well as the name and memory location of the image file associated with each video feed (process action 206).

Figure 2B:
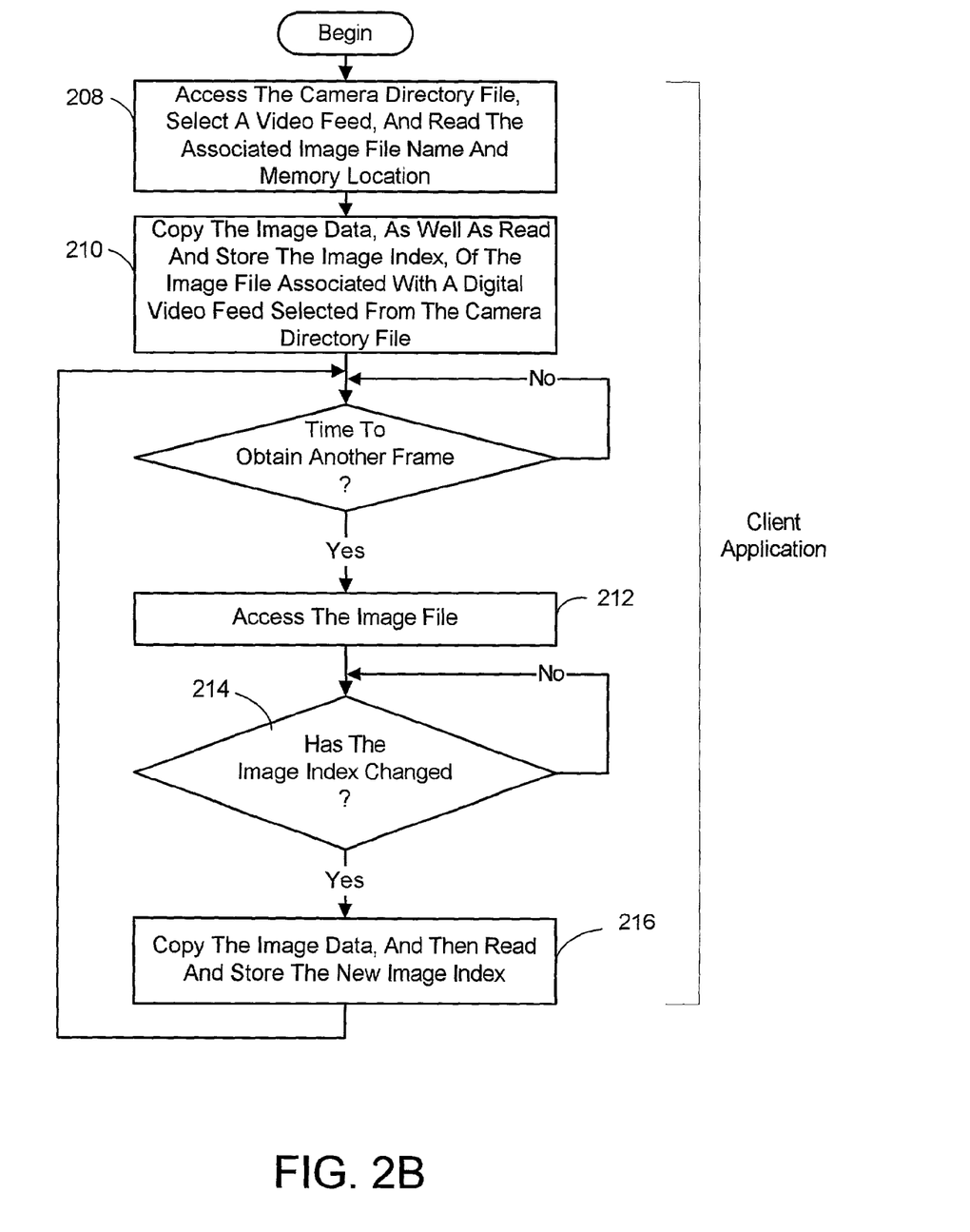
FIG. 2B is a flow chart diagramming an overall process for facilitating a client application running on a computer in accessing at least one digital video feed which is simultaneously made available to multiple client applications running on that computer.

As for the client applications, each accesses a live video feed in the manner outlined in FIG. 2B. Namely, the client application:

a) accesses the camera directory file, selects a video feed and reads the associated image file name and memory location (process action 208);

b) copies the image data, and reads and stores the image index, of the image file associated with the selected digital video feed (process action 210); and c) whenever it is desired to access another frame of the selected digital video feed, the client application, accesses the image file (process action 212), determines if the value of the image index has changed (process action 214), and if it has, copies the image data, and then reads and stores the new image index (process action 216).

The specific roles of the live image server and the client applications, and the interplay between them, will now be described in more detail in the sections to follow.

1. Live Image Server

Figure 3:
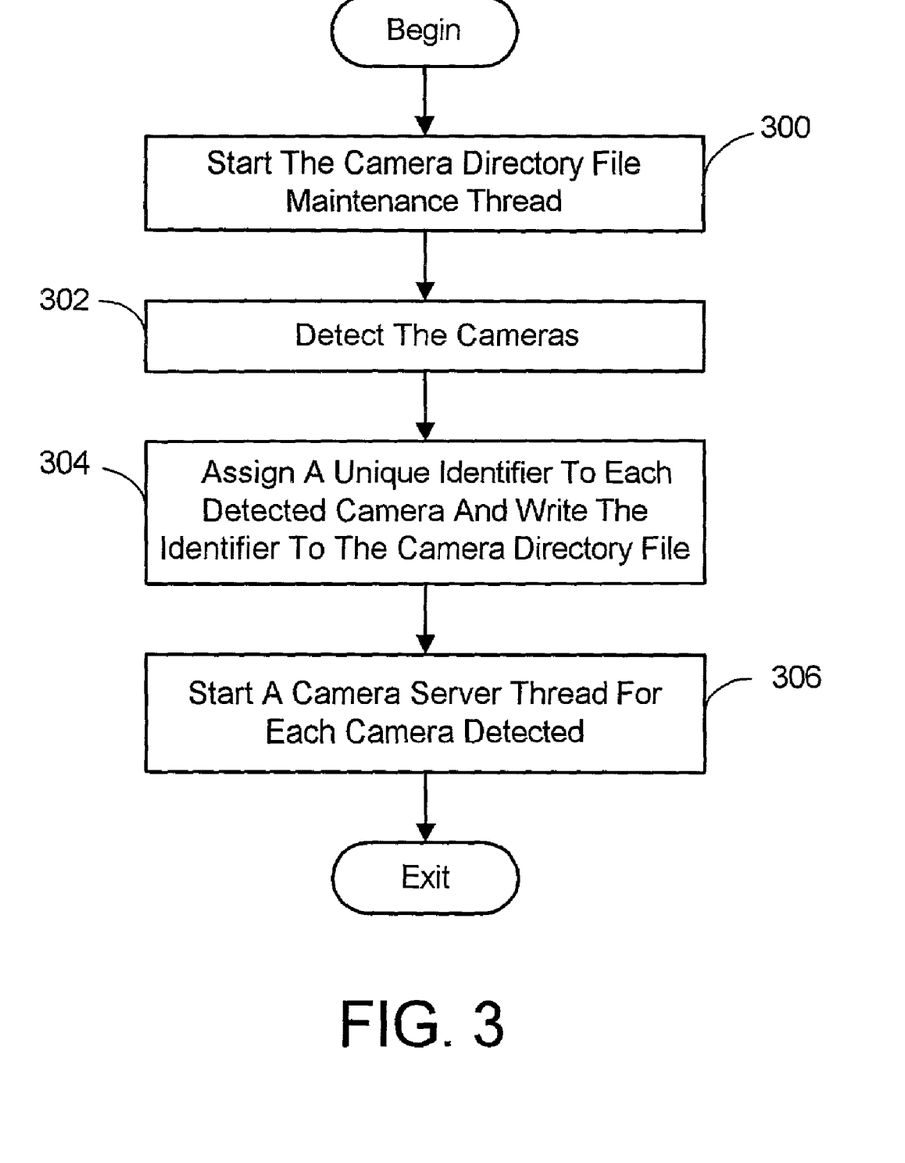
FIG. 3 is a flow chart diagramming a process for initiating and performing the main thread of the overall live image server process of FIG. 2A.

The live image server works by making video image data available to any number of applications running on a computing device, such as a PC. This is accomplished by first initiating a live image server process. The main thread of the live image server process is outlined in FIG. 3. As can be seen the first process action 300 is to start a camera directory file maintenance thread, which will be discussed shortly. In addition, as indicated by process action 302, digital imaging devices (such as a digital video camera) connected to the aforementioned computing device, are detected. In many cases, this will just be one camera, although any number of cameras connected to the PC can be detected and handled by the live image server. It is noted that while the foregoing detection action can involve detecting all the cameras connected to a computing device, it is also possible to configure the main thread to ignore any camera if it is desired to provide only the video image data associated with certain cameras to the applications running on the computing device. A unique identifier or "camera name" is assigned to each of the detected cameras and this identifier is written to a camera directory file (process action 304), which will be described later. It is noted that other useful camera-related information can be written to the camera directory file for each camera, such as the frame size, the number of bits per pixel and the frame rate. These items will also be discussed later. Finally, as indicated by process action 306 in FIG. 3, a camera server thread is started for each camera detected in action 302.

The names assigned to each camera (or its feed) should have significance to the client applications. For example, an application that requires a frontal face view of a person working in front of a computer monitor to, for instance, determine the person's presence, attentiveness or where on the screen the person is looking, would know the name assigned to the particular camera that provides this view. This coordination between the name assigned to a camera and the view provided can be accomplished in any appropriate way. For example, standard camera names associated with a particular view could be established and known by both the live image server and the client applications. It would also be possible to provide an appropriate interactive user interface in which the user inputs the name corresponding to the camera providing the proper view to the client application.

1.1 Single Camera Server Thread

Figure 4:
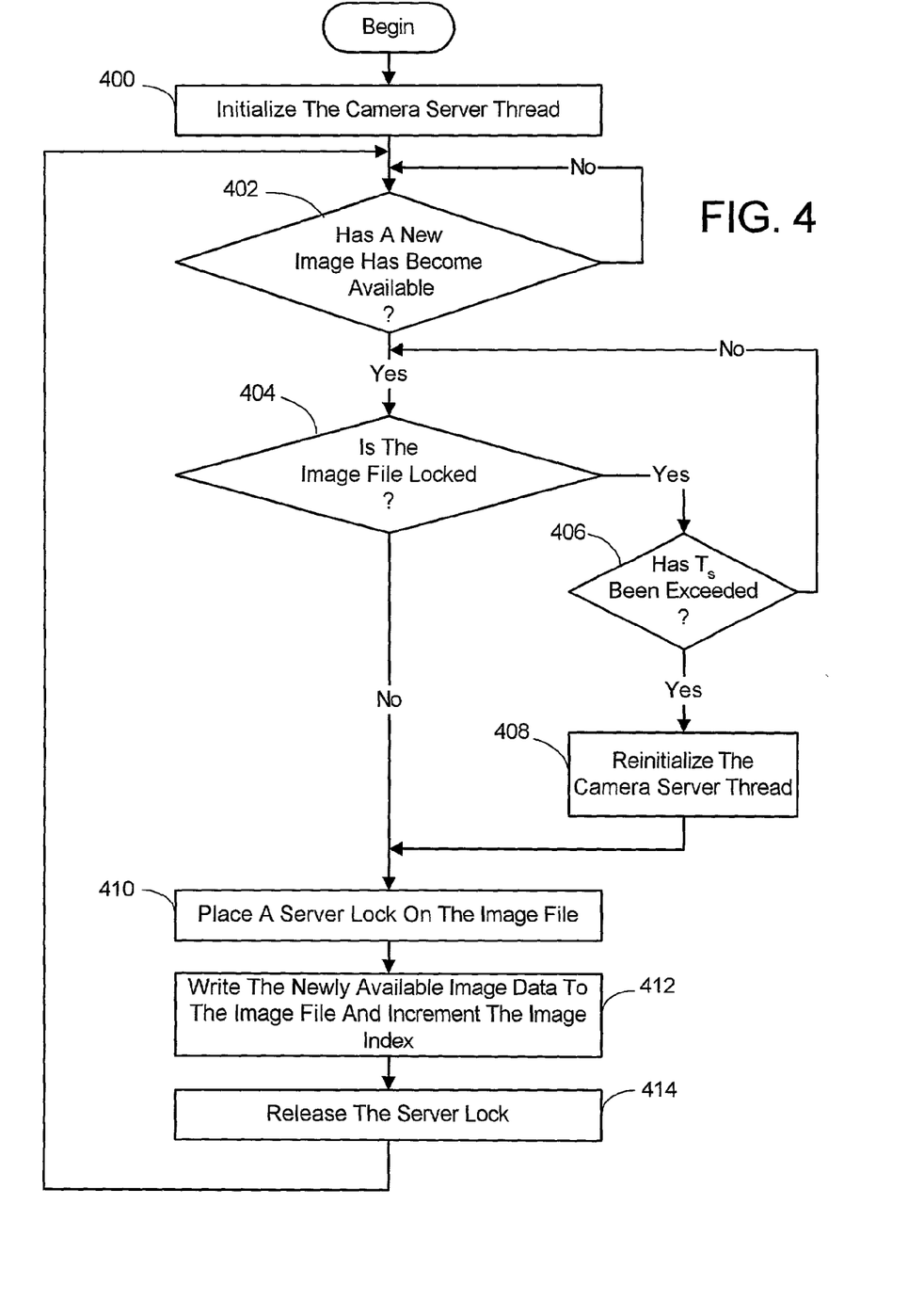
FIG. 4 is a flow chart diagramming a process for initiating and performing the camera server thread of the overall live image server process of FIG. 2A.

The process associated with each instance of the camera server thread is outlined in FIG. 4. The first process action 400 performed is to initialize the camera server thread. This entails generating a unique image file name, updating the camera directory in global memory with this file name and certain parameters associated with the camera corresponding to the camera server thread under consideration. This camera directory in global memory is a memory location accessible by all the camera server threads and the camera directory file maintenance thread, which is dedicated to storing a list of cameras and their particulars. In addition, an index referring to the number of video frames received so far is zeroed, and the aforementioned maintenance thread is notified of the camera's existence.

Figure 5:
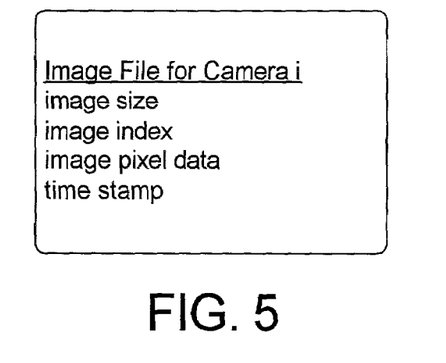
FIG. 5 is a diagram illustrating a camera directory file and its contents.

As for the image file, its desired contents are illustrated in FIG. 5. Specifically, the image file associated with camera n (or its feed) includes the actual image pixel data corresponding to the last frame output by the camera and the index number associated with that image. In addition, the size of the image data output by the camera for each frame (typically in bytes) can be included. This information could be used for error correction purposes to ensure the correct number of bytes are copied by a client application. Lastly, the image file can include a time stamp indicating the time the file was created. The time stamp can be used by client applications that need to know when an image was captured. For example, the time each image was captured would be useful in applications computing the velocity of objects in the image sequence, and for applications reasoning about moving objects seen from more than one camera. It is noted that the foregoing image file contents represent just some of the information that can be included in the image file. More data could be made part of the image file as desired.

In regard to the image pixel data included in the image file, this data can be captured from the camera output in any appropriate manner. For example, the live image server could employ Microsoft Corporation's "DIRECTSHOW"™ application programming interface, to build a filter graph having a video capture source, sample grabber, and null renderer module for each camera. Essentially, this configuration results in a "call" to the camera server thread associated with the camera for which the filter graph was built each time a new image from the camera is available for inclusion in the image file.

Figure 6:
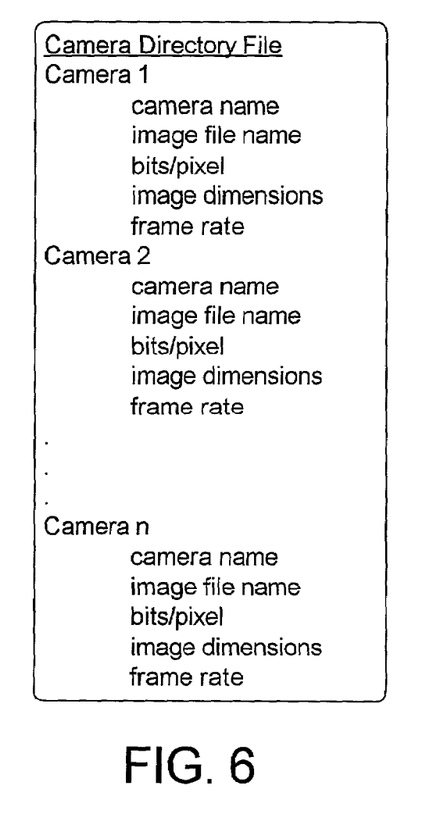
FIG. 6 is a diagram illustrating an image file and its contents.

The aforementioned camera directory file includes certain information about every camera detected in the main thread of the live image server process. Specifically, as illustrated in FIG. 6, the camera directory file includes, for each detected camera (1 through n), the unique camera identifier or "name" designated during the performance of the previously-described main thread of the live image server process, the name and memory location of the current image file associated with the camera, the number of bits per pixel of the image pixel data contained in the camera's image file, and the dimensions of the image represented by the image pixel data in the image file. It is noted that the latter two parameters are provided so that a client application can determine how big an image file is before accessing it. This information is the aforementioned camera name and particulars that were stored in the global memory by the camera server threads. It is noted that data described above is not intended to be all inclusive in that other camera information as desired could also be stored in the global memory by the camera server threads and used to create and maintain the camera directory file.

Referring again to FIG. 4, once a camera server thread has been initialized, it is determined whether an image has become available (process action 402). In other words, it is determined if the camera associated with the camera server thread has output an image. If not, process action 402 is repeated until an image becomes available. If it is determined that an image is available, it is next determined if the image file is locked (process action 404). An image file is locked whenever one or more client applications are in the process of reading the image file, as will be discussed shortly. Accordingly, the camera server thread is determining if the file has a client read lock in place. If there is a client read lock on the image file, it is determined whether a prescribed timeout period ($T_s$) has been exceeded since the client read lock was first encountered (process action 406). If the timeout period has not yet been exceeded, the camera server thread repeats process actions 404 and 406 until either the file becomes unlocked or the timeout period is finally exceeded. Whenever the prescribed timeout period is exceeded, the camera server thread reinitializes (process action 408). This re-initialization entails generating a new image file name, resetting the index to zero, updating the global memory with the new file name, and notifying the maintenance thread of the change. The purpose of using the prescribed timeout period and the re-initialization procedure is to ensure a "misbehaving" client application (e.g., one that has hung-up, crashed, etc.) responsible for placing the read lock on an image file for an unreasonable amount of time cannot indefinitely deny other client applications from accessing new images from the camera feed (as will be described later). In tested embodiments of the live image server, $T_s$ was set to about 300 milliseconds with success.

Once it is determined in process action 404 that the image file is unlocked, or the camera server thread is re-initialized in process action 408, a server lock is place on the image file (process action 410). This precludes access to the image file by client applications for the time the lock is in place. The purpose of the lock, is to allow time for the newly available image data to be written into the image file and to increment the image index value by one, as indicated in process action 412. The new image data replaces any image data previously written into the image file. Once the image file has been updated, the server lock is released (process action 414). The camera server thread then repeats process actions 402 through 414 as appropriate for as long as the live image server process is active.

1.2 Camera Directory File Maintenance Thread

Figure 7:
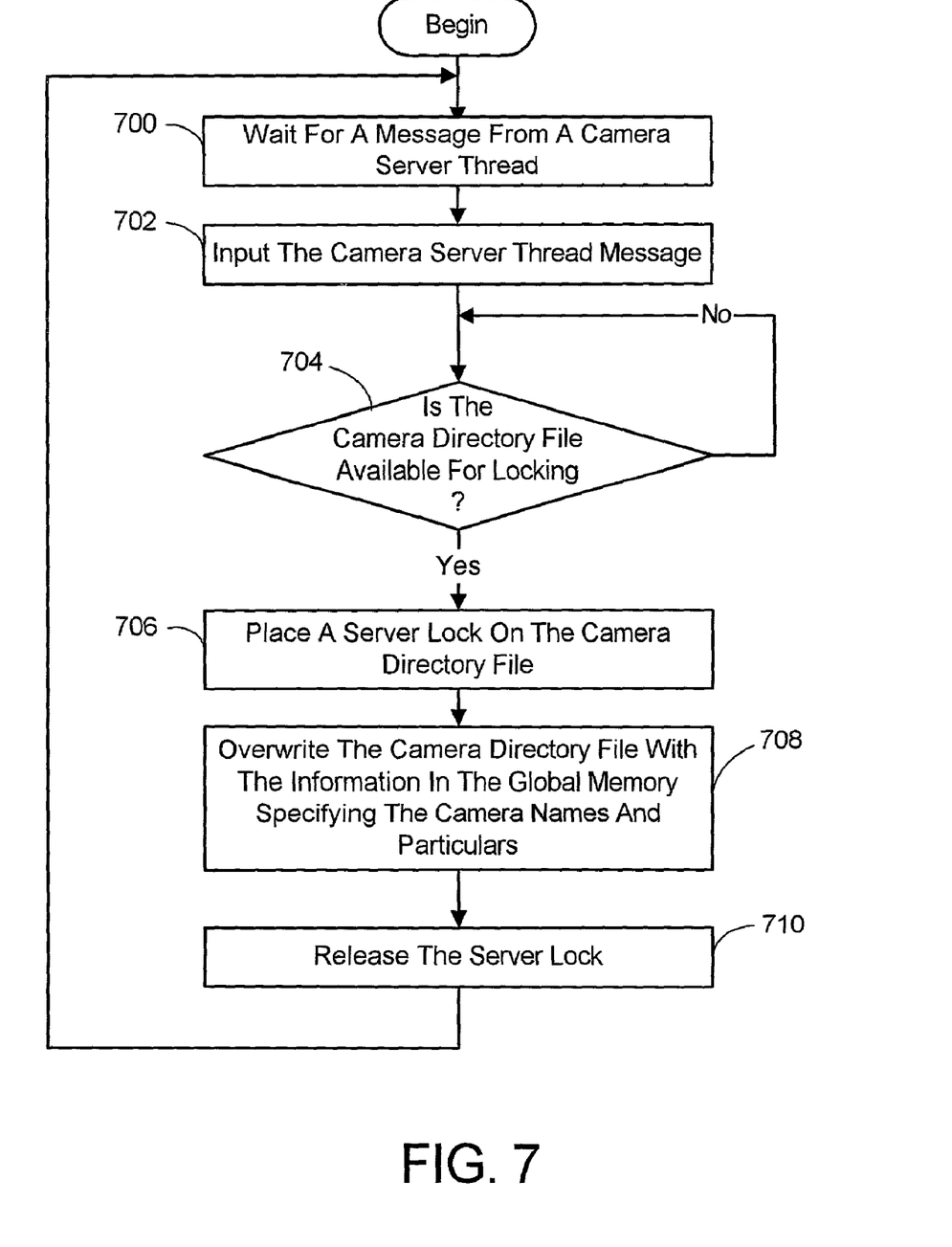
FIG. 7 is a flow chart diagramming a process for initiating and performing the camera directory file maintenance thread of the overall live image server process of FIG. 2A.

The aforementioned camera directory file maintenance thread is responsible for maintaining an up-to-date, current version of the camera directory file described above. Specifically, referring to FIG. 7, once initiated in the main thread, the camera directory file maintenance thread waits to receive a message from the camera server threads notifying it that a new camera feed is available and that the global memory has been updated with the camera name and particulars, or that the camera particulars have been updated by a camera server thread (process action 700). It is noted that this waiting process can involve a polling procedure where the maintenance thread actively polls the camera server threads for update information. However, a less processor intensive method used in tested embodiments of the maintenance thread involved the maintenance thread "sleeping" until awakened by an event-namely a message from a camera server thread. Whenever a message is received from a camera server thread, the maintenance thread inputs the message (process action 702), and attempts to place a lock on the camera directory file. The type of lock used by the server (both the single camera server threads and the maintenance thread) is a "mutex" or mutual exclusive lock. This type of lock ensures that only one program or routine can access a particular resource at a time. As will be explained in the next section, client applications periodically access the camera directory file to read its contents by placing a mutex lock on the file. Thus, whenever the maintenance thread obtains a lock on the camera directory file all the client applications are precluded from accessing it. However, if a client application already has a lock on the camera directory file, the maintenance thread will not be able to lock the file and must wait for the client application's lock to be removed. To this end, in process action 704, the maintenance thread first determines if the camera directory file is available for locking (i.e., there is no client application-imposed lock on the file). If the camera directory file is locked, the maintenance thread repeats process action 704 until the lock is removed. Once the camera directory file is available for locking, the maintenance thread places a lock on the file (process action 706). The camera directory file is then overwritten with the information in the global memory specifying the camera names and particulars (process action 708). As the camera server thread updated this memory prior to notifying the maintenance thread, the memory will contain the most up-to-date camera information. The camera directory file maintenance thread next removes the lock on the camera directory file (process action 710), thus making it available to client applications. The maintenance thread then waits for additional messages to come in from a camera server thread and repeats the foregoing process for as long as the live image server is active.

It is noted that each camera server thread could alternately copy the camera directory file during the initialization or re-initialization actions described above, and then update this local copy. Then, rather than updating a global memory, the camera server thread would simply provide the updated file to the camera directory file maintenance thread when it notifies the maintenance thread of its existence or a change in the camera particulars.

2. Client Application

Figure 8A:
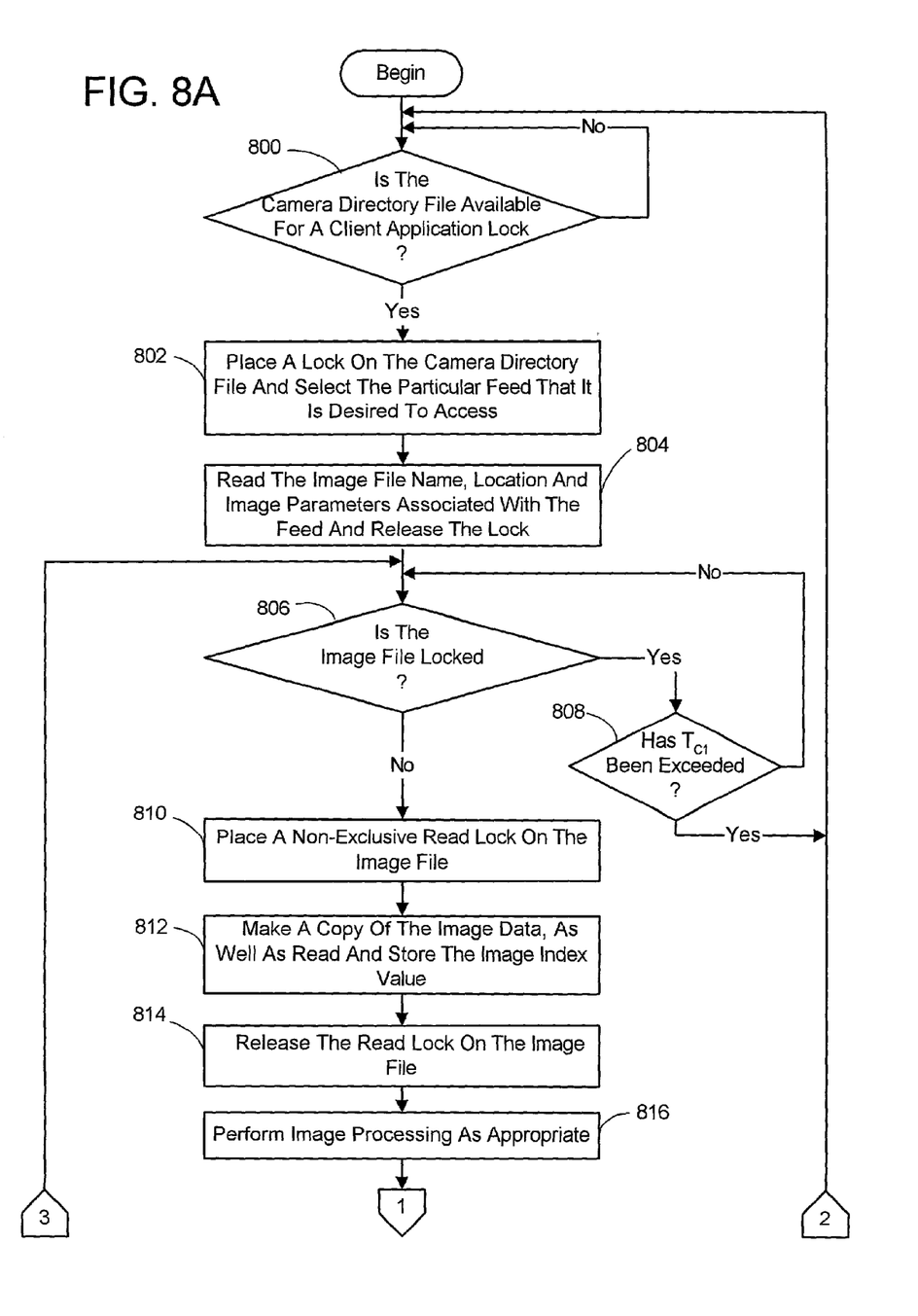
FIGS. 8A and 8B are a flow chart diagramming a process for implementing the overall process of FIG. 2B.
Figure 8B:
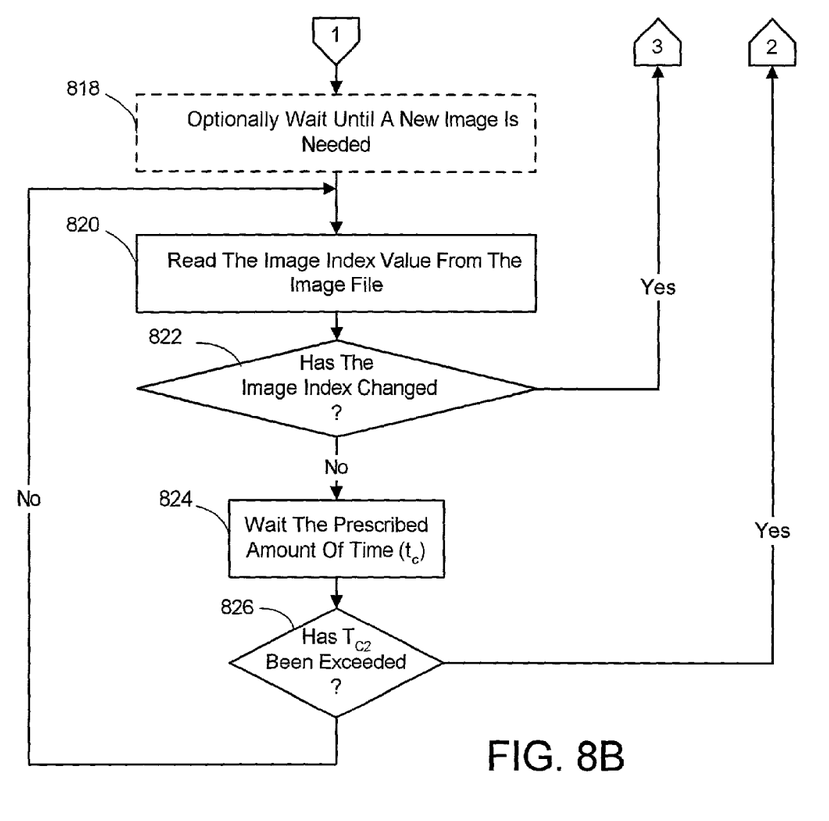

Referring to FIGS. 8A and 8B, a process is outlined by which a client application obtains a sequence of frames from a camera providing input to the live image server. The client first accesses the camera directory file to determine what camera feeds are available. To this end, in process action 800, the client determines if the camera directory file is available for a lock. The camera directory file will be available except when the above-described maintenance thread of the live image server has placed a lock on it to update the camera list and associated camera particulars. If the camera directory file is not available for reading, then process action 800 is repeated until the file is available. Whenever the camera directory file is available, the client application places a mutex lock on the file and selects the particular camera feed that it desires to access from the camera directory file's list (process action 802. The client reads the image file name, location and image parameters (e.g., bits per pixel and image dimensions) associated with that feed from the camera directory file and releases the lock (process action 804).

The client application next attempts to place a read lock on the image file associated with the selected camera feed. It is noted that this type of lock is not mutually exclusive like the mutex lock, thus multiple clients can lock the image file for reading simultaneously. This is advantageous as typically the image data contained in the image file will be changed frequently and the various client applications will regularly access the image file to obtain the new data, and an exclusive lock would likely result in delay. On the other hand, a client application will typically place a lock on the camera directory file much less frequently. Thus, the mutex type lock can be used for that task without a substantial risk of delay. The aforementioned read lock attempt is accomplished by first determining if the image file is locked by a camera server thread of the live image server (process action 806). As described previously, the camera server thread associated with an image file's camera periodically places a lock on the file to write new image data to the file and to increment the image index value. If the image file is locked by the server for writing, it is determined whether a prescribed timeout period ($T_{c1}$) has been exceeded since the server lock was first encountered (process action 808). If the timeout period $T_{c1}$ has not yet been exceeded, the client application repeats process actions 806 and 808 until either the image file becomes unlocked or the timeout period is finally exceeded. Whenever the prescribed timeout period $T_{c1}$ is exceeded, the client application begins the foregoing process over starting with process action 800 in which the client determines if the camera directory file is available for locking. The client application attempts to re-access the camera directory file in hopes that the live image server has been shut down and restarted. The server lock will not normally exceed the timeout period $T_{c1}$ unless it crashed with the lock in place. In tested embodiments of the live image client, $T_{c1}$ was set to about 300 milliseconds for this purpose.

If, however, it is determined in process action 806 that the image file is not locked by the live image server, then the client application places a non-exclusive read lock on the file (process action 810). As mentioned above, this read lock prevents the camera server thread of the server from overwriting the file while the client is reading it. Once the read lock is successfully obtained, the client application makes a local copy of the image data, and reads and stores the image index value (process action 812). The client application then releases the read lock (process action 814), and performs whatever local image processing is appropriate for the application (process action 816).

Referring now to FIG. 8B, the client application can optionally wait until it needs a new frame from the camera (as shown by the broken line box of process action 818), or skip the wait and attempt to obtain a new frame in real time. Either way, whenever the client application desires a new image, it essentially repeats the access procedure described above. However, the client first reads the image index value from the image file (process action 820). It is noted that an image file read lock is not performed when reading the index value. This value is so small (e.g., a 4-byte value in tested embodiments of the live image server) that there is no significant risk that a client would attempt to read the value just as it is being changed by the server's camera server thread, and thereby obtain corrupted "half-written" data. Thus, unlike when a client is copying image data which takes much longer in relation to reading the index value, there is little chance that corrupted data will be read. In addition, some operating systems treat read and write events involving small data values such as the image index in a serial manner anyway. Thus, in such systems all chance of reading half-written data is eliminated. Reading the image index without locking the image file is advantageous as it substantially decreases the chance of lock contention between client applications and so improves the overall efficiency of the system.

It is next determined whether the image index has changed from the last-read index value (process action 822). If not, the client application waits a prescribed amount of time ($t_c$) and then checks if the image index has changed. Specifically, the client application waits the prescribed amount of time $t_c$ (process action 824), and then determines if the total amount of time waited since first inquiring whether the image index had changed exceeds a prescribed timeout period $T_{c2}$ (process action 826). If the prescribed timeout period $T_{c2}$ has been exceeded, the client application starts over with process action 800. If, however, it is determined that the total amount of time waited since first inquiring whether the image index had changed does not exceed the prescribed timeout period $T_{c2}$, then process actions 820 through 826 are repeated, as appropriate. Since $t_c$ is made smaller than $T_{c2}$, the foregoing pause and query procedure could be repeated multiple times before either a new image is found to be available or $T_{c2}$ is exceeded. Ideally, $t_c$ is set to be less than or equal to the frame rate of the selected camera feed (which may be found in the camera directory file). In other words $t_c$ would be equal to or less than the amount of time it takes the camera to output a new frame. In tested embodiments, $t_c$ was set to approximately 10 milliseconds—an amount of time generally shorter than the frame rate of most digital cameras. The prescribed timeout period $T_{c2}$ is set to a length of time that ensures the live image server has enough time to update the image file even if multiple client applications are accessing and read locking. This time period could be exceeded for instance if a "misbehaving" client has locked the image file for too long, thereby preventing the server from writing a new frame to the file. By returning to the camera directory file, a client application that was denied access to an image file in excess of the prescribed timeout period $T_{c2}$ can check whether the live image server has started another image file for this camera, as described previously. In tested embodiments of the live image client, $T_{c2}$ was set to about 300 milliseconds with satisfactory results.

Whenever it is discovered during an iteration of the pause and query procedure that the index has changed (and so a new image is available), the client application obtains the image data by repeating process actions 806 through 826 as appropriate. The foregoing process continues for as long as the client wishes to obtain video from the live image server.

It is noted that a client application can also access images from more than one camera by instantiating the above process for each image feed it wishes to access.

Wherefore, what is claimed is:

1. A computer-implemented process for making a digital video feed from an imaging device available to multiple applications running on a computer, comprising using the computer to perform the following process actions:
   inputting image data associated with a first-inputted frame of the video feed output by the imaging device;
   creating an image file comprising the inputted image data, said image file being accessible by each of the multiple applications; and
   whenever image data associated with a subsequent frame of the video feed is output by the imaging device,
      inputting the image data associated with the last-outputted frame of the video feed, and
      replacing the image data currently in the image file with the inputted image data associated with the last-outputted frame of the video feed.

2. The process of claim 1, wherein:
   the process action of creating the image file further comprises, including an image index in the image file and setting it to one to indicate that image data associated with just one frame has been input and made part of the image file; and wherein the process action of replacing the image data further comprises, incrementing the image index by one to indicate that image data associated with another frame has been placed in the image file whenever image data associated with a subsequent frame of the video feed is output by the imaging device and made part of the image file.

3. The process of claim 1, wherein the process action of creating the image file further comprises including an indicator of the size of the image data contained in the file.

4. The process of claim 1, wherein the process action of creating the image file further comprises including a time stamp indicating the time the image file was created or last modified.

5. The process of claim 1, further comprising the process actions of:

generating a name for the image file being created; and
providing the image file name to a global memory location.

6. The process of claim 5, further comprising the process action of providing, to the global memory location, information concerning the digital video feed from the imaging device comprising the number of bits per pixel associated with the image data and the dimensions of each frame of the video feed.

7. The process of claim 1, wherein the process actions of inputting image data associated with the first-inputted frame of the video feed and creating an image file comprising the inputted image data, comprise the actions of:

(a) including an image index in the image file which indicates the number of times image data has been input and made part of the image file;
(b) determining whether the imaging device has output image data associated with a frame of the video feed;
(c) whenever it is determined the imaging device has not output image data associated with a frame of the video feed, repeating action (b); and
(d) whenever it is determined the imaging device has output image data associated with a frame of the video feed,
  (d1) determining whether a read lock exists on the image file, wherein said read lock can be placed on the image file by any of the multiple applications running on the computer,
  (d2) whenever it is determined that a read lock exists on the image file, determining whether a prescribed period of time has elapsed since it was first determined that the read lock exists on the image file,
  (d3) whenever it is determined the prescribed period of time has not been exceeded, repeating actions (d1) and (d2),
  (d4) whenever it is determined the prescribed period of time has been exceeded, generating a new name for the image file, providing the new image file name to a global memory and zeroing the image index, and
  (d5) whenever it is determined that a read lock does not exist on the image file or a new name has been generated for the image file, placing a lock on the image file, writing the image data associated with the first-inputted frame of the video feed into the image file, incrementing the image index by one, and releasing the lock.

8. The process of claim 7, wherein the prescribed period of time is on the order of 300 milliseconds.

9. The process of claim 7, wherein the process actions of inputting the image data associated with the last-outputted frame of the video feed whenever image data associated with a subsequent frame of the video feed is output by the imaging device, and replacing the image data currently in the image file, comprise the actions of:

(a) determining whether the imaging device has output image data associated with a frame of the video feed;
(b) whenever it is determined the imaging device has not output image data associated with a frame of the video feed, repeating action (a); and
(c) whenever it is determined the imaging device has output image data associated with a frame of the video feed,
  (c1) determining whether a read lock exists on the image file, wherein said read lock can be placed on the image file by any of the multiple applications running on the computer,
  (c2) whenever it is determined that a read lock exists on the image file, determining whether a prescribed period of time has elapsed since it was first determined that the read lock exists on the image file,
  (c3) whenever it is determined the prescribed period of time has not been exceeded, repeating actions (c1) and (c2),
  (c4) whenever it is determined the prescribed period of time has been exceeded, generating a new name for the image file, providing the new image file name to a global memory and zeroing the image index, and
  (c5) whenever it is determined that a read lock does not exist on the image file or a new name has been generated for the image file, placing a lock on the image file, writing the image data associated with the with the last-outputted frame of the video feed into the image file in lieu of any existing image data in the file, incrementing the image index by one, and releasing the lock.

10. The process of claim 9, wherein the prescribed period of time is on the order of 300 milliseconds.

11. A system for making multiple live digital video feeds simultaneously available to multiple applications running on a computer, comprising:

a plurality of imaging devices providing said live multiple digital video feeds;
a general purpose computing device; and
a computer program comprising program modules executable by the computing device, wherein the computing device is directed by the program modules of the computer program to,
  determine what digital video feeds are active and assign a unique identifier to each feed that is to be made available to said multiple applications;
  for each video feed assigned an identifier,
    input image data associated with each frame of the video feed as it becomes available, and
    maintain an image file comprising the inputted image data associated with the most recently available frame of the video feed, but no previous frames, wherein said image file is accessible by each of the multiple applications, and
    assign a name to the image file; and
  maintain a camera directory file which is accessible by each of the multiple applications and which comprises the identifiers assigned to each digital video feed currently available to the multiple applications, as well as the name and a memory location of the named image file associated with each video feed.

12. The system of claim 11, wherein the program module for maintaining the image file for each video feed assigned an identifier, comprises sub-modules for:
inputting image data representing a first-inputted frame of the video feed associated with the image file;
including the inputted image data representing the first-inputted frame of the video feed in the image file;
including an image index in the image file and setting it to one; and
whenever image data associated with a subsequent frame of the video feed becomes available,
inputting the image data associated with the last-outputted frame of the video feed, and
replacing the image data currently in the image file with the inputted image data associated with the last-outputted frame of the video feed, and
incrementing the image index by one to indicate that image data associated with another frame has been input and made part of the image file.

13. The system of claim 11, wherein the multiple applications access the image file associated with a video feed by placing a read lock on the file, thereby precluding updating the image file with new image data while the read lock is in place, and wherein the program module for assigning a name to the image file, comprises sub-modules for:
assigning a name to the image file whenever inputting image data representing a first-inputted frame of the video feed associated with the image file; and
assigning a new name to an image file any time the image file cannot be updated with image data associated with the most recently available frame of the video feed within a prescribed period of time owing to a read lock being placed on the image file; and wherein
whenever a name is assigned to an image file, the name is associated with the video feed identifier and stored in a prescribed global memory location in lieu of any previously stored name associated with that video feed identifier.

14. The system of claim 13, wherein the program module for maintaining a camera directory file, comprises sub-modules for:
(a) determining each time an image file name is stored in the prescribed global memory location;
(b) whenever it is determined that an image file name has been stored in the prescribed global memory location,
(b1) determining whether a read lock exists on the camera directory file, wherein said read lock can be placed on the camera directory file by any of the multiple applications,
(b2) whenever it is determined that a read lock exists on the camera directory file, repeating sub-module (b1),
(b3) whenever it is determined that a read lock does not exist on the camera directory file, placing a lock on the camera directory file, overwriting any data contained in the camera directory file with the data contained in the global memory location, and releasing the lock.

15. The system of claim 11, wherein the program module for maintaining a camera directory file comprises a sub-module for including the number of bits per pixel and image dimensions associated with the image data of the named image file corresponding to each video feed.

16. The system of claim 11, wherein the program module for maintaining a camera directory file comprises a sub-module for including the frame rate of each video feed.

17. A computer-readable storage medium having computer-executable instructions for making live digital video feeds from one or more imaging devices simultaneously available to multiple applications running on a computing device, said computer-executable instructions executed on a computing device comprising:
determining what imaging devices are currently providing digital video feeds and assigning a unique identifier to each feed that is to be made available to said multiple applications;
for each video feed assigned an identifier,
maintaining an image file comprising image data associated with the most recently available frame of the video feed, but no previous frames, wherein said image file is accessible by each of the multiple applications, and
assigning a name to the image file; and
maintaining a camera directory file which is accessible by each of the multiple applications that comprises the identifiers assigned to each digital video feed currently available to the multiple applications, as well as the name and a memory location of the named image file associated with each video feed.

18. The computer-readable storage medium of claim 17, wherein the multiple applications access the image file associated with a video feed by placing a read lock on the file, thereby precluding updating the image file with new image data while the read lock is in place, and wherein the instruction for assigning a name to the image file, comprises sub-parts for:
assigning a name to the image file whenever inputting image data representing a first-inputted frame of the video feed associated with the image file; and
assigning a new name to an image file any time the image file cannot be updated with image data associated with the most recently available frame of the video feed within a prescribed period of time owing to a read lock being placed on the image file; and wherein
whenever a name is assigned to an image file,
making a copy of the camera directory file,
associating the image file name with the video feed identifier, and
updating the copy of the camera directory file with the image file name in place of any previous name associated with that video feed identifier.

19. The computer-readable storage medium of claim 18, wherein the instruction for maintaining the camera directory file, comprises sub-parts for:
(a) determining each time a copy of the camera directory file is updated;
(b) whenever it is determined that a copy of the camera directory file has been updated,
(b1) determining whether a read lock exists on the camera directory file, wherein said read lock can be placed on the camera directory file by any of the multiple applications,
(b2) whenever it is determined that a read lock exists on the camera directory file, repeating instruction sub-part (b1),
(b3) whenever it is determined that a read lock does not exist on the camera directory file, placing a lock on the camera directory file, overwriting the existing camera directory file contents with the updated copy of the camera directory file, and releasing the lock.

20. A computer-implemented process for facilitating an application running on a computer in accessing at least one digital video feed which is simultaneously made available to multiple applications running on that computer, comprising using the computer to perform the following process actions:

accessing a camera directory file comprising identifiers identifying each digital video feed currently available for access, as well as a name and memory location of an image file associated with each video feed which comprises image data associated with the most recent frame of the video feed available, but no previous frames, and an image index representing a frame sequence number;

copying the image data, and reading and storing the image index, contained in the image file associated with a particular digital video feed that it is desired to access from the available video feeds listed in the camera directory file; and whenever it is desired to access another frame of the selected digital video feed,    determining if the value of the image index has changed in comparison to the last, previously stored, image index value, and    whenever it is determined that the image index value has changed, copying the image data, and reading and storing the image index, contained within the image file.

21. The process of claim 20, wherein the process action of accessing the camera directory file and identifying the name and location of the image file, comprises the action of:

determining whether the camera directory file is available for reading; and    whenever the camera directory file is available for reading,       placing a lock on the camera directory file,       selecting the particular digital video feed that it is desired to access from the available video feeds listed in the camera directory file,       reading the image file name and location associated with the selected video feed from the camera directory file, and       releasing the lock on the camera directory file.

22. The process of claim 20, wherein the process actions of copying the image data, and reading and storing the image index, comprises the actions of:

(a) determining whether the image file associated with the selected video feed is available for reading;

(b) whenever the image file associated with the selected video feed is determined not to be available for reading, determining whether a prescribed period of time has elapsed since it was first determined that the image file associated with the selected video feed was determined not to be available for reading;

(c) whenever it is determined the prescribed period of time has not been exceeded, repeating actions (a) and (b);

(d) whenever it is determined the prescribed period of time has been exceeded, (d1) accessing the camera directory file and identifying a name and location of an image file which is associated with a particular digital video feed that it is desired to access from the available video feeds listed in the camera directory file, (d2) repeating actions (a) through (d); and (e) whenever the image file associated with the selected video feed is determined to be available for reading, (e1) placing a non-exclusive read lock on the image file, and (e2) after the image data is copied, and the image index is read and stored, releasing the read lock.

23. The process of claim 22, wherein the prescribed period of time is on the order of 300 milliseconds.

24. The process of claim 22, wherein the process action of determining if the value of the image index has changed, comprises the actions of:

reading the image index contained within the image file; and comparing the just-read image index value to the index value stored immediately before the just-read value, and determining if the values are different.

25. The process of claim 24, further comprising a process action of whenever it is determined that the just-read image index value is not different from the index value stored immediately before the just-read value, (f) waiting a prescribed interval of time, then determining if a second prescribed period of time has been exceeded, (g) whenever the second prescribed period of time has been exceeded, accessing the camera directory file and identifying a name and location of an image file which is associated with a particular digital video feed that it is desired to access from the available video feeds listed in the camera directory file, and then repeating actions (a) through (e), (h) whenever the second prescribed period of time has not been exceeded, (h1) determining if the value of the image index has changed in comparison to the last, previously stored, image index value, (h2) whenever it is determined that the image index has not changed, repeating actions (a) through (c), as appropriate, and (h3) whenever it is determined that the image index value has changed repeating actions (a) through (e).

26. The process of claim 25, wherein the first and second prescribed periods of time are both on the order of 300 milliseconds, and wherein the prescribed interval of time is on the order of 10 milliseconds.

* * * * *